United States Patent
Okamoto et al.

(10) Patent No.: US 6,301,550 B1
(45) Date of Patent: Oct. 9, 2001

(54) PHASE DELAY CORRECTION SYSTEM

(75) Inventors: Kiyokazu Okamoto, Tsukuba; Yoshiyuki Omori, Kure, both of (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/198,578

(22) Filed: Nov. 24, 1998

(30) Foreign Application Priority Data

Nov. 28, 1997 (JP) .................................................. 9-329042

(51) Int. Cl.$^7$ .................................................. G01B 11/24
(52) U.S. Cl. .............................. 702/167; 73/104; 73/105; 345/177; 359/123; 379/406; 702/71; 702/72; 702/79; 702/85; 702/94; 702/95; 702/167; 702/168
(58) Field of Search ................................. 702/71, 72, 79, 702/85, 94, 95, 168; 73/104, 105; 345/177; 359/123; 379/406

(56) References Cited

U.S. PATENT DOCUMENTS

| 4,126,036 | 11/1978 | Nilan et al. | 73/105 |
| 5,073,710 | * 12/1991 | Takagi et al. | 250/231 |
| 5,390,536 | 2/1995 | Zhang et al. | 73/105 |

FOREIGN PATENT DOCUMENTS

| 0455983 A1 | 11/1991 | (EP) . |
| 0652419 A1 | 5/1995 | (EP) . |
| 2233459 A | 1/1991 | (GB) . |
| 61-149822 A | 7/1986 | (JP) . |

OTHER PUBLICATIONS

D'Azzo, John J. et al., Linear Control System Analysis and Design–Conventional and Modern, 2 ed., McGraw–Hill Book Company, New York, p. 533, Mar. 1998.

* cited by examiner

Primary Examiner—Arthur T. Grimley
(74) Attorney, Agent, or Firm—Oliff & Berridge, PLC

(57) ABSTRACT

A phase delay correction system for use in a shape measurement is capable of removing the distortion of a restored shape and the mechanical positional deviation caused by a phase delay occurring during signal processing, and enables a Fourier series processing procedure to be adopted as is. A detector performs a relative scan of an object to be measured at a constant speed. A signal processing unit converts a shape detection signal obtained by the scan to digital data, and processes the digital data. The signal processing unit has a digital filter for removing a noise component, an LUT memory for storing correlation data representing a correlation between a spatial phase and an amount of phase delay measured in advance in an output of the filter a Fourier coefficient calculating section for calculating coefficients of a cosine component and a sine component of each spatial phase for expressing detection data obtained from the filter in a Fourier series, and a Fourier coefficient correction section for correcting each of the coefficients calculated by the calculating section, on the basis of the data read out from the LUT memory.

9 Claims, 2 Drawing Sheets

PHASE DELAY CORRECTION SYSTEM

BACKGROUND OF THE INVENTION

1. Field of the Invention

The present invention relates to a shape measuring apparatus which measures the shape of an object to be measured by processing an output signal obtained when the object is scanned with a detector, and more particularly to a phase delay correction system which is capable of measuring the shape with high accuracy by concerning a phase delay which occurs in a signal process for processing a shape detection signal expressed in a Fourier series.

2. Prior Art

In an accurate shape measurement of the object to be measured, such as a measurement of the surface roughness, the three-dimensional shape or objects similar in shape and roughness, a relative scan of the object is performed using a contact or non-contact type detector, thereby obtaining a shape detection signal as a position function, and this detection signal is processed. When a predetermined spatial range around the object is scanned at a constant speed, the detection signal is output from the detector as a time function. Generally, this detection signal is sampled and converted to digital data. The digital data is then processed by a computer for use in a shape measurement. In this digital processing, the detection signal is expressed in the form of a Fourier series whose components include a spatial phase component corresponding to a spatial position.

In the shape detection data expressed in a Fourier series, as the order of the Fourier series is increased in a range wherein a noise against a true value can be controlled, the precision with which shape detection data represents the shape of the object in the scanned spatial range is improved. Therefore, in recent years, the order of the Fourier series (that is, the order of a spatial harmonic component) has been increased more and more to reproduce the shape of the object with high reproducibility, and a demand for an order higher than the 500th order has also become remarkable.

In a signal processing procedure for converting a signal output from the shape detector to digital data and processing the data in the form of a Fourier series, a large number of noises enter into the signal. These noises include a noise entering from the outside of the shape detector, a quantization error noise generated in the process of converting an analog signal output from the detector to a digital signal, and a noise due to a switching operation of an electric circuit. A filter for taking out components having frequencies within a predetermined range is generally used for the purpose of suppressing these noises. The filter may be arranged in an analog circuit, or a digital filter may be employed if the signal is digitized.

In the case where the shape detection data is processed through the digital filter as described above, a phase difference between the input and output of the filter is observed depending on the filter characteristics. The phase difference between the input and the output is added to a phase delay in the signal transmitted from the detector. This phase delay causes a "distortion" of the shape and a "mechanical positional deviation" when the shape of the object to be measured is reproduce. Thus, a reduction in the "distortion" and the "mechanical positional deviation" has been the subject to be achieved for measuring the shape of the object with high accuracy.

Conventionally, some methods for preventing the above-described "distortion" have been proposed, while no methods have been proposed for preventing the "mechanical positional deviation". However, a technique for preventing the "distortion" sometimes causes a considerable "mechanical positional deviation". In the case where a bi-directional relative scan, not a unidirectional relative scan, is performed for the purpose of a time reduction, the "mechanical positional deviation" causes a hysteresis error in the reproduced shape. Besides, this error becomes remarkable proportionally as the scanning speed is increased.

The mechanical positional deviation caused by the phase delay will now be explained more in detail. For instance, let it be considered the case where the scanning width for the object to be measured is 100 mm, the object is scanned at a speed of 100 mm/sec and detection data is obtained with a spatial frequency of 500 Hz (that is, the maximum measurement order is 500). In this case, provided that the digital filter has a linear phase characteristic and the angle of the phase delay is 90 degrees at a spatial frequency of 500 Hz, for example, the mechanical positional deviation of the object from the origin (the scanning reference position) is estimated as (100 mm/500)×(90°/360°)=50 $\mu$m in case of the maximum measurement order. If the scan is bi-directional, the hysteresis error calculated in terms of mechanical position will be 2×50 $\mu$m=100 $\mu$m.

If the object to be measured is processed with an ordinary machine tool of a numerical control type and the control level of the numerical control system is 0.1 to 1 m in the processing accuracy, the above-described positional deviation and the postional hysteresis error will be unallowable.

As explained above, the phase delay which occurs during the signal processing causes the positional deviation of the object from the origin when the detector is moved relative to the object at a constant speed. Further, the deviation of the phase characteristic from the linear phase characteristic causes the distortion of the shape which is reproduced from the detection data.

The effects of the phase delay depends on the characteristics of the inserted filter. For example, a Butterworth filter which is used quite often is a recursive filter whose elements and parameters necessary to attain the desired attenuation are small in number. However, the recursive filter is not so preferable in terms of its phase characteristics. FIG. 4 is a diagram showing a step response in a Butterworth communication function (cited from "Linear Control System Analysis and Design" authored by D'Azzo Houpis). Referring to the eighth-order step response, it can be understood that the response is quite different from the simplest linear phase characteristic.

For the purpose of preventing only the "distortion" of the shape caused by the deviation of the phase characteristic of the digital filter from the linear phase characteristic, a filter having the linear phase characteristic, that is, a non-recursive filter, can be employed. The non-recursive filter can be realized by arranging the design of the calculation processing section of the digital filter.

When the non-recursive filter is adopted to realize the desired noise suppressing characteristic, the amount of phase delay becomes quite large, and accordingly an increase occurs in the mechanical positional deviation.

In the case where the detection data regarding the shape of the object and including the position data from the origin is stored prior to data processing for the restoration of the shape and there is no time limitations in the data processing, the bi-directional filtering system which is capable of eliminating the effects of the phase delay is efficient. However, this filter can be adopted under the condition in which all data regarding the shape are stored prior to the data processing. Further, those data all involve the position data from the origin which serves as a detection reference point, in consideration of the mechanical positional deviation. Due to this, the amount of data is considerably large. Such a condition may not always be satisfied, and the processing takes a long time because of the large amount of data. Therefore, the above filter is not suitable for use in high speed processing for measuring the shape of the object simultaneously with a machining process in real time, for example.

As explained above, when the shape detecting signal, obtained by scanning the object to be measured with the detector, is processed as data expressed in a Fourier series in order to restore the shape of the object, the phase delay during the signal processing has been a problematic matter which causes the distortion of the shape and the mechanical positional deviation of the object.

SUMMARY OF THE INVENTION

An object of the present invention is to provide a phase delay correction system for use in a shape measurement, which system is capable of removing the distortion of the restored shape and the mechanical positional deviation caused by a phase delay occurring during the signal processing, and which system enables a data processing procedure with a Fourier series to be adopted as is.

According to one aspect of the present invention, there is provided a phase delay correction system for correcting a phase delay which occurs in digital data during converting a shape detection signal to the digital data, the shape detection signal being obtained by scanning a detector relative to an object to be measured at a constant speed, and processing the digital data expressed in a Fourier series, the phase delay correction system comprising: measuring means for measuring an amount of phase delay for each spatial phase of the Fourier series in the digital data in the advance and for storing correlation data representing a correlation between each spatial phase and the amount of phase delay; coefficient calculating means for calculating a coefficient of each spatial phase component of the Fourier series from the digital data; and coefficient correcting means for correcting each of the calculated coefficients, based on the correlation data.

In a preferred embodiment of the present invention, when $k\theta$, Fk and Gk represent a k-th-order spatial phase, a k-th-order cosine component and a k-th-order sine component of said Fourier series, respectively, and when $\rho(k\theta)$ represents the phase delay amount stored together with the spatial phase $k\theta$ as said correlation data, said coefficient correcting means uses Fk•cos $[\rho(k\theta)]$–Gk•sin $[\rho(k\theta)]$ instead of Fk, and uses Gk•cos $[\rho(k\theta)]$=Fk•sin $[\rho(k\theta)]$ instead of Gk.

According to another aspect of the present invention, there is provided a shape measuring apparatus comprising: a detector for performing a relative scan of an object to be measured at a constant speed and outputting a shape detection signal; an A/D converter for converting the shape detection signal output from the detector to digital data; and a digital signal processing unit for obtaining a shape measurement value by processing the digital data output from the A/D converter. The digital signal processing unit comprises: a digital filter for removing a noise component from the digital data converted by the A/D converter and outputting detection data; storage means for storing correlation data representing a correlation between each spatial phase and its phase delay amount which have been measured in advance; Fourier coefficient calculating means for calculating coefficients of a sine component and a cosine component of each spatial phase for expressing the detection data output from the digital filter in a Fourier series; and Fourier coefficient correction means for correcting each of the coefficients calculated by the Fourier coefficient calculating means, based on the correlation data read out from the storage means.

According to the present invention, in the case where shape detection data of the object is expressed in a Fourier series and processed, the distortion of the restored shape of the object and the mechanical positional deviation due to a phase delay occurring during the detection data processing are corrected by correcting a cosine component and a sine component of the Fourier series so that a shape restoration with high accuracy can be achieved. Further, according to the present invention, under the condition wherein the scanning speed of the detector is constant, the amount of processed data is smaller and the data processing is more speedy than in the case where the detection data and position data are stored altogether and processed.

DETAILED DESCRIPTION OF THE PREFERRED EMBODIMENT

An embodiment of the present invention will now be described with reference to accompanying drawings.

Figure 1:
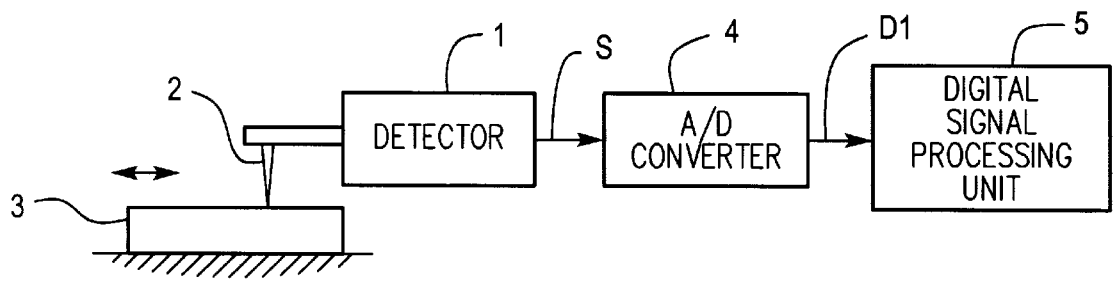
FIG. 1 is a diagram showing the overall structure of a shape measuring apparatus according to one embodiment of the present invention.

FIG. 1 is a diagram showing the overall structure of a shape measuring apparatus according to the present invention. In the example shown in FIG. 1, a detector 1 is a roughness detector which detects the surface roughness of a measuring object 3 by using a stylus 2. Both the object 3 and the detector 1 are moved relative to each other at a constant speed to scan a surface of the object 3. A fluctuation of a scanning speed can easily be controlled to approximately 1/3000 by using a current technique. Hence, an analog shape detection signal S which represents the shape of the object as a time function, though it should be represented as a position function, is obtained from the detector 1.

The detector 1 shown in FIG. 1 is just an example in the present invention. For example, non-contact type detection using light etc. or a contact type detection can be used as a method of a detection. An another type of detector such as a detector for measuring not only the surface roughness but also a three-dimensional shape, etc. of the object can be used in the invention.

The analog output signal S from the detector 1 is converted to digital data D1 by an A/D converter 4 and is sent to a digital signal processing unit 5 such as a computer and the like. The digital signal process unit 5 fetches the digital data and develops it in the form of a Fourier series to perform data processing.

Figure 2:
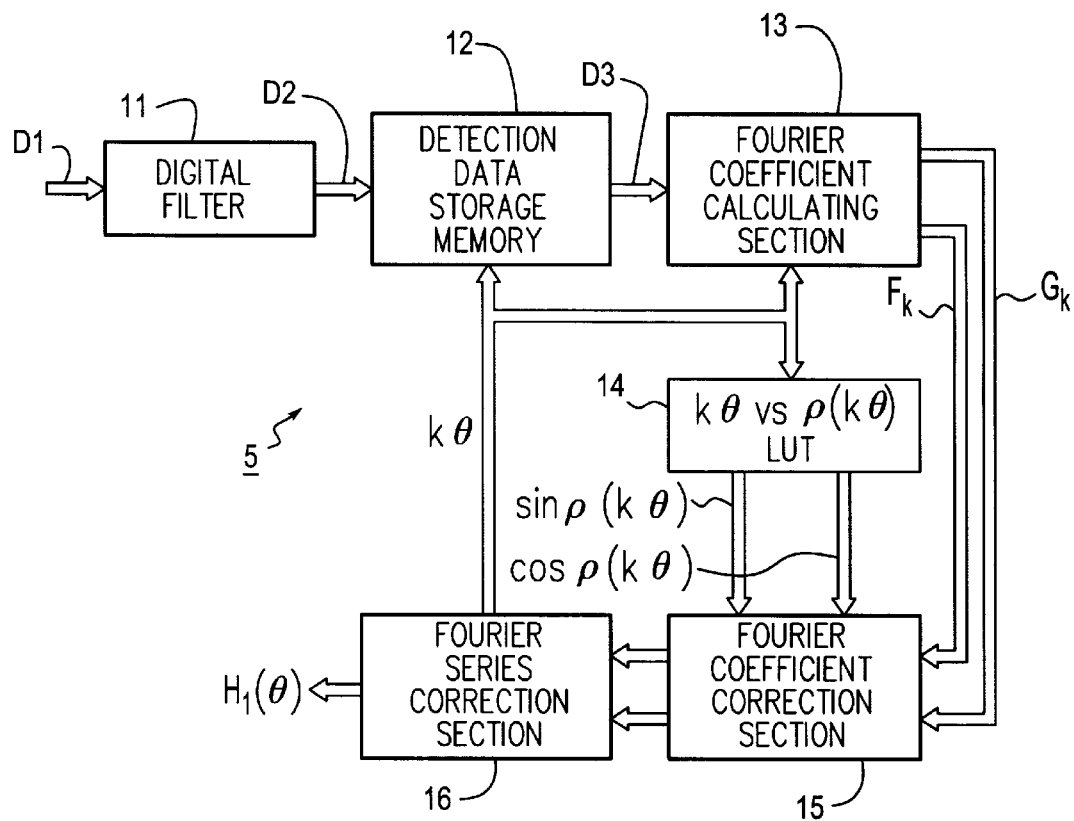
FIG. 2 is a block diagram showing the systematic structure of a digital signal processing unit of this embodiment.

FIG. 2 is a block diagram showing the systematic structure of the digital signal processing unit 5 of the present invention. A digital filter 11 is a low pass filter which is arranged at an input stage to remove a high-frequency noise component included in the fetched data D1. Data D2 from which the noise component has been removed by the digital filter 11 is temporarily stored in a detection data storage memory 12. As shown in the following formula (1), digital data D3 which is read out from the detection data storage memory 12 is developed in the form of a Fourier series by a Fourier coefficient calculating section 13:

$$H_0(\theta) = \Sigma F_k \cdot \cos(k\theta) + \Sigma G_k \cdot \sin(k\theta) \quad (1)$$

where represents a unit spatial phase and k represents as an arbitrary order.

Figure 3:
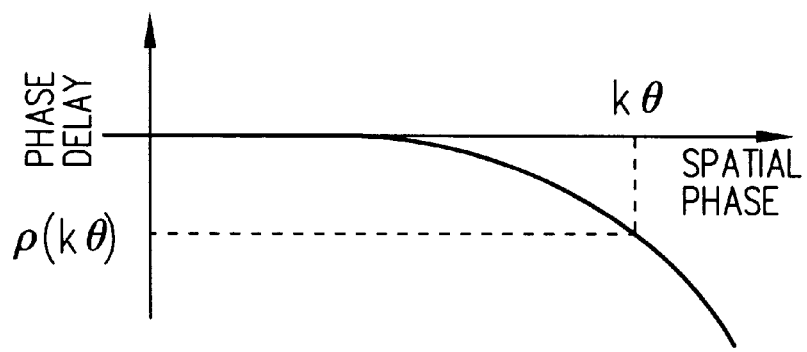
FIG. 3 is a diagram showing the correlation between a spatial phase and a phase delay which are stored in an LUT memory of the embodiment.
Figure 4:
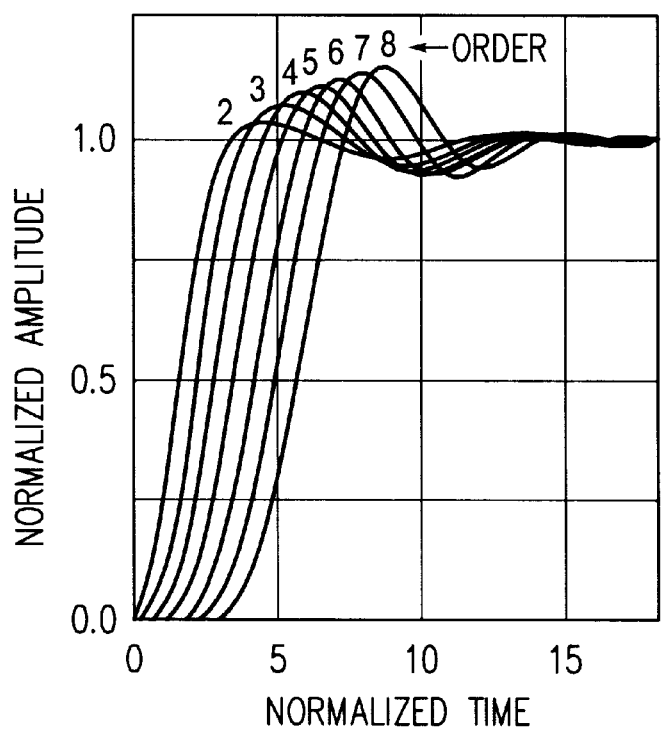
FIG. 4 is a diagram showing the step response characteristic of a Butterworth filter.

As shown in FIG. 3, for example, the digital signal processing unit 5 includes a lookup table (LUT) memory 14 storing correlation data representing a correlation between a spatial phase k and a phase delay amount $(k\theta)$ which have been measured in advance, in order to correct a phase delay in the detection data as expressed in the formula 1. This LUT memory 14 is formed, for example, by measuring the amount of phase delay which occurs from an input of the A/D converter 4 to an output of the digital filter 11 of FIG. 2 when each of reference signals having their respective frequencies in a predetermined frequency range is input to the A/D converter 4. In a preferred embodiment, in order to facilitate a coefficient conversion which will be explained later, data indicating the phase delay amount $\rho(k\theta)$ is stored in the LUT memory 14 in the form of "$\cos[\rho(k\theta)]$, $\sin[\rho(k\theta)]$" where $(k\theta)$ is as an address.

A coefficient $F_k$ of the cosine component and a coefficient $G_k$ of the sine component shown in the formula 1 are calculated by the Fourier coefficient calculating section 13, and are sent to a Fourier coefficient correction section 15 so as to be corrected on the basis of the phase delay amount $\rho(k\theta)$ read out from the LUT memory 14. A principle of this Fourier coefficient correction is as follows:

Let it be assumed that the spatial phase k on the right side of the formula (1) is indeed delayed by $\rho(k\theta)$. In this case, in order to correct the formula (1), the term "$k\theta - \rho(k\theta)$" can be used instead of k on the right side of the formula (1). The detection data $H_0(\theta)$ expressed in the formula (1) can then be rewritten as detection data $H_1(\theta)$ expressed in formula (2).

$$H_1(\theta) = \sum F_k \cdot \cos[k\theta - \rho(k\theta)] + \sum G_k \cdot \sin[k\theta - \rho(k\theta)] \quad (2)$$
$$= \sum \{F_k \cdot \cos[\rho(k\theta)] - G_k \cdot \sin[\rho(k\theta)]\} \cos(k\theta) +$$
$$\sum \{G_k \cdot \cos[\rho(k\theta)] + F_k \cdot \sin[\rho(k\theta)]\} \sin(k\theta)$$

Hence, as regards the coefficients $F_k$ and $G_k$ calculated by the Fourier coefficient calculating section 13, the Fourier coefficient correction section 15 performs a coefficient conversion in accordance with a conversion algorithm in the formula (3) shown below, based on the correction data $\sin[\rho(k\theta)]$ and $\cos[\rho(k\theta)]$ read out from the LUT memory 14:

$$F_k \rightarrow F_k \cdot \cos[\rho(k\theta)] - G_k \cdot \sin[\rho(k\theta)]$$
$$G_k \rightarrow G_k \cdot \cos[\rho(k\theta)] + F_k \cdot \sin[\rho(k\theta)] \quad (3)$$

By using these converted coefficients, a Fourier series correction section 16 obtains the Fourier series $H_1(\theta)$ which is expressed by the above-described formula (2).

The coefficient calculation and the coefficient correction are sequentially performed in regard to order k=1 to n which is designated by the Fourier series correction 16, such that the n-th-order Fourier series $H_1(\theta)$ in which the phase delay has been corrected is obtained.

The obtained Fourier series $H_1(\theta)$ is in the same form as that of the original Fourier series $H_1(\theta)$, therefore, a conventional Fourier series processing procedure can be employed as is, and a shape restoration can be performed by a conventional process.

According to the present invention, as explained above, in the case where shape detection data regarding the object to be measured is expressed in a Fourier series, a shape restoration can be achieved with high accuracy by correcting the distortion of the restored shape and the mechanical positional deviation caused by the phase delay which occurs during the processing of the detection data. Further, in the present invention, under the condition wherein the scanning speed of the detector is constant, the amount of data is smaller and the processing is more speedy than in the case where all detection data are stored together with the position data and are processed.

What is claimed is:

1. A phase delay correction system for correcting a phase delay which occurs in digital data during converting a shape detection signal to the digital data, said shape detection signal being obtained by scanning a detector relative to an object to be measured at a constant speed, and processing the digital data expressed in a Fourier series, said phase delay correction system comprising:

measuring means for measuring an amount of phase delay $\rho(k\theta)$ for each spatial phase $k\theta$(wherein k represents a number of orders) of the Fourier series in the digital data in the advance and for storing correlation data representing a correlation between each spatial phase and the amount of phase delay;

coefficient calculating means for calculating a coefficient of each spatial phase component of said Fourier series from said digital data; and coefficient correcting means for correcting each of the calculated coefficients by use of $k\theta - \rho(k\theta)$ instead of $k\theta$, based on said correlation data.

2. The phase delay correction system according to claim 1, wherein:

when $F_k$ and $G_k$ represent a k-th-order cosine component and a k-th-order sine component of said Fourier series, respectively, said coefficient correcting means uses:

$F_k \cdot \cos[\rho(k\theta)] - G_k \cdot \sin[\rho(k\theta)]$, instead of $F_k$; and $G_k \cdot \cos[\rho(k\theta)] + F_k \cdot \sin[\rho(k\theta)]$, instead of $G_k$.

3. The phase delay correction system according to claim 1, wherein said measuring means measures the amount of phase delay which occurs when each of reference signals having their respective frequencies within a predetermined frequency range is processed.

4. The phase delay correction system according claim 1, wherein said coefficient calculating means includes filtering means for filtering the digital data converted from said shape detection signal.

5. The phase delay correction system according to claim 4, wherein said filtering means is a low pass filter.

6. A shape measuring apparatus comprising:

a detector for performing a relative scan of an object to be measured at a constant speed and outputting a shape detection signal;

an A/D converter for converting the shape detection signal output from the detector to digital data; and a digital signal processing unit for obtaining a shape measurement value by processing the digital data output from said A/D converter, wherein said digital signal processing unit comprises
a digital filter removing a noise component from the digital data converted by said A/D converter and outputting detection data,
storage means for storing correlation data representing a correlation between each spatial $k\theta$ (wherein k represents a number of orders) and its phase delay amount $\rho(k\theta)$ which have been measured in advance,
Fourier coefficient calculating means for calculating coefficients of a sine component and a cosine component of each spatial phase for expressing the detection data output from said digital filter in a Fourier series, and
Fourier coefficient correction means for correcting each of the coefficients calculated by the Fourier coefficient calculating means by use of $k\theta-\rho(k\theta)$ instead of $k\theta$, based on the correlation data read out from said storage means.

7. The shape measuring apparatus according to claim 6, wherein
when Fk and Gk represent a k-th-order spatial phase, a k-th-order cosine component and a k-th-order sine component of said Fourier series, respectively, said Fourier coefficient correlation means uses:

$Fk \cdot \cos[\rho(k\theta)] - Gk \cdot \sin[\rho(k\theta)]$, instead of Fk; and $Gk \cdot \cos[\rho(k\theta)] + Fk \cdot \sin[\rho(k\theta)]$, instead of Gk.

8. The shape measuring apparatus according to claim 6, wherein said storage means stores the correlation data obtained by measuring an amount of phase delay which occurs when each of reference signals having their respective frequencies in a predetermined frequency range is processed by said digital filter.

9. The shape measuring apparatus according to claim 6, wherein said digital filter is a low pass filter.

* * * * *